United States Patent [19]

Bauer et al.

[11] Patent Number: 5,117,096
[45] Date of Patent: May 26, 1992

[54] SYSTEM FOR CONTROLLING AND MONITORING THE DISTRIBUTION OF GOODS

[75] Inventors: Günther Bauer, Ottobrunn; Hubert Fleckenstein, Harthausen, both of Fed. Rep. of Germany

[73] Assignee: Messerschmitt-Bölkow-Blohm GmbH, Fed. Rep. of Germany

[21] Appl. No.: 631,156

[22] Filed: Dec. 20, 1990

[30] Foreign Application Priority Data
Dec. 20, 1989 [DE] Fed. Rep. of Germany ....... 3942009

[51] Int. Cl.$^5$ .............................................. G06F 15/20
[52] U.S. Cl. ................................. 235/375; 235/384; 235/462; 364/403
[58] Field of Search ............... 235/375, 384, 462; 364/401, 403, 478

[56] References Cited

U.S. PATENT DOCUMENTS

| | | | |
|---|---|---|---|
| 4,882,475 | 11/1989 | Miller et al. | 235/384 |
| 4,958,064 | 9/1990 | Kirkpatrick | 235/384 |
| 5,038,283 | 8/1991 | Caukney | 364/403 |

Primary Examiner—Harold Pitts
Attorney, Agent, or Firm—Evenson, Wands, Edwards, Lenahan & McKeown

[57] ABSTRACT

A system for the control and monitoring of the distribution of goods. A first unit is mounted with the goods to be transported, specifically a control and monitoring unit in which freight-specific data are stored and in which sensors are also provided which sense the momentary condition of the distribution process and write it into corresponding memories. Access to the control and monitoring units takes place by way of a normal interface by means of an active memory card which, in turn, can be connected with an analysis unit by means of which a log of the distribution process can be established.

20 Claims, 3 Drawing Sheets

SYSTEM FOR CONTROLLING AND MONITORING THE DISTRIBUTION OF GOODS

BACKGROUND AND SUMMARY OF THE INVENTION

The invention relates to a system for controlling and monitoring the distribution of goods and merchandise.

A large number of systems are known in which the distribution of goods, for example the transport storage or availability of merchandise is, at least with respect to partial aspects, monitored semiautomatically or fully automatically. For example, in the case of an in-plant conveyer system for the commissioning of merchandise, such control is achieved by means of data carriers, which are mounted on transport containers for the merchandise and include destination addresses, as well as data stations which read the destination address when the transport containers travel by and adjust the transport path in such a manner that the destination address is finally reached. Compare German Patent Document DE-PS 30 10 637.

German Patent Document DE-PS 25 08 201, disclosed an arrangement for the no-contact arrival and departure control of transport containers each of which is connected with a transmitter/receiver having a programmable data memory. The transmitter/receiver is supplied with energy by means of a highfrequency energy transmitter, is queried and then transmits merchandise-specific data, such as information concerning the type of the merchandise, the owner or the addressee, to an external data receiver. The received data are then processed in a central processing unit in the manner of taking an inventory.

Finally, passive identity cards are known which are similar in shape and the appearance to a Eurocheck card and have an integrated circuit in which specific data of the cardholder are stored. Compare, for example, German Patent Document DE-OS 31 43 915. Accessing and changing the data are performed by way of a stationary external computer with a query and response apparatus. In the known identity card, data communication is accomplished via a transmitter/receiver unit with a microwave transmitter antenna, and a receiving antenna on the identity card. This type of an identity card is used, for example, as an account card, a company pass with access control, an insurance identification, etc.

All these systems take into account one aspect of the distribution of goods. However, container transport of packaged merchandise and goods requires a continuous monitoring and control from the manufacturer of the merchandise to the final consumer, particularly in view of product and risk liability as well as for the purpose of maintaining a transport system for freight within the national economy. Since the transportation of merchandise and goods in commerce as a rule takes place in a so-called open system in which uninterrupted documentation from the manufacturer to the consumer is often not possible, it is desirable that uninterrupted proof be maintained concerning the course of the transport from a management aspect as well as from the technical aspect, particularly in the case of environmentally hazardous materials. Semiautomatic or fully automatic production management systems, however, are essentially known only for internal transport systems; in partial aspects with respect to the destination systems, they are also known in rail traffic. Otherwise shipping papers are used almost exclusively for maintaining proof in business management. Thus, impermissible intervention into the transport of goods is possible because such systems cannot exclude the possibility in practice.

It is an object of the invention to provide a system of the initially mentioned type in which uninterrupted monitoring of the freight traffic is possible and in which impermissible intervention is therefore made more difficult.

According to the invention, this object is achieved by a distribution and contral system in which a first unit, as the control and monitoring unit, is firmly connected with the goods to be distributed or with the transport container and accompanies the goods throughout the distribution process. In addition to a computer, it has sensors and actuators by means of which the momentary state of the distribution process is recorded, stored and possibly displayed. Access to this checking and monitoring unit is possible only by means of an active programmable memory card as the second unit, in such a manner that it is ensured by corresponding codes that only authorized persons obtain access to the data of all units.

A third unit, the analysis unit, has a read circuit which reads data stored in this memory card and updated by communication with the control and monitoring unit and summarizes it, for example, to form a log of the distribution process.

The whole system and particularly the control and monitoring unit may be built as a microstructure in the manner of a microsystem structure. The control and monitoring unit is, for example, a compact leaded box which has a standardized interface for the data communication with the memory card and, depending on the application, is equipped with different sensors and actuators, and can be programmed for different functions. The control and monitoring unit should be designed to be as secure as possible with respect to the deliberate destruction and falsification of data, and may, for example, be mounted in the bracing of a container where it would not be visible and would be difficult to access. This applies particularly to the elements of the control and monitoring unit which carry or process important data for the merchandise or goods and/or the distribution process, thus, for example, the computer.

Naturally, the interface, into which the active memory card can be inserted, remains freely accessible. The memory card itself is designed corresponding to the above-mentioned active programmable cards. It is used not only for the data access to the control and monitoring unit, but also replaces the previous shipping and transport papers and is therefore used as an electronic bill of lading and may also be filed as such and be activated. This memory card may be used, for example, for acknowledging the assumption or the transfer of responsibility for the transport and control operations; for acknowledging possible momentary conditions of the transport process indicated by the control and monitoring unit, such as an alarm condition; or for documenting the condition of the merchandise within the realm of responsibility. For the originator or addressee of the goods to be distributed, the memory card can document the whole course of the distribution process, such as the transfer of the goods from a truck to rail traffic, in which case, the date, the participating persons, etc. are indicated at the same time. Likewise, the read-out information stored in the memory card concerning the previous momentary conditions of the merchandise and of the distribution process may be indicated to the respective holder of the memory card by means of the analysis unit; for example, possible alarm conditions or the exceeding of limit values. The memory card therefore not only replaces the shipping papers but also makes it possible to obtain more information and gain greater control.

By means of the third unit, the analysis unit, the party responsible for the transport can, for example, read out the data stored in the control and monitoring unit up to the point in time of the delivery and document them as a proof of the party's performance. The addressee of the goods, in turn, will have access to the stored data during the entire distribution process, and can therefore determine whether limit values were exceeded during this distribution process and which persons were responsible for the transported goods during the distribution process. The third unit may also be present as a portable quicklook unit for the highspeed control of the merchandise and of the distribution process. This type of a portable unit may also comprise a printer by means of which information concerning the distribution process, such as the time, the controls, the monitoring events, the speed of the transport, etc. may be printed out.

The memories in the control and monitoring device and in the memory cards are programmed by means of a programming unit which among other things, determines the required steps and monitoring criteria within the distribution process and the distribution path. In addition, code circuits are provided so that only authorized persons who have access by way of an original coding may input or alter programming data, a feature which is especially important in view of the risk liability.

The system according to the invention may preferably be expanded by the addition of modules, such as sensors; for example protection and position modules which are installed at the location where the goods ar compiled and which emit monitoring and release signals for the transport or signals with respect to the exceeding of limit values. When such a monitoring signal is present, corresponding alarms are triggered, for example, by means of actuators. Likewise, position modules are conceivable which, together with the control and monitoring unit are arranged directly on the goods to be distributed, or on the transport container, and continuously emit the position coordinates of this container so that the path of the goods to be transported can be monitored continuously. Protection and position modules of this type may also be used for the protection of personal property, such as containers, pieces of luggage, passenger cars, and similar objects. These position modules may also be used as long-time functional modules in a closed-circuit operation.

Transmitting modules which comprise laser, IR, acoustical or optical transmitters and receivers, are integrated into the control and monitoring unit. The transmitting modules are programmed by way of the interfaces of the monitoring and control unit. If, for example, a truck transporting a container with a control and monitoring unit arrives near an entrance gate, a border crossing, or the like, in general, near a so-called central control point, the container can identify itself by way of the transmitting module if the central control point has corresponding receiving circuits and, if necessary, transmitting circuits.

Automatic position and protection modules may also be used in the case of hazardous goods, thereby facilitating improved monitoring capabilities. In addition, it is possible to connect several control and monitoring units with one another by way of a microbus structure, such as an optical fiber bus. Data concerning several goods or transport containers may be read out by way of a common bus, making it possible, for example, to write data into the memories of the individual monitoring and control units by wa of an address. This permits a monitoring by actuators and a display, for example, in the cab of a transport train.

Other objects, advantages and novel features of the present invention will become apparent from the following detailed description of the invention when considered in conjunction with the accompanying drawings.

DETAILED DESCRIPTION OF THE DRAWINGS

Figure 1:
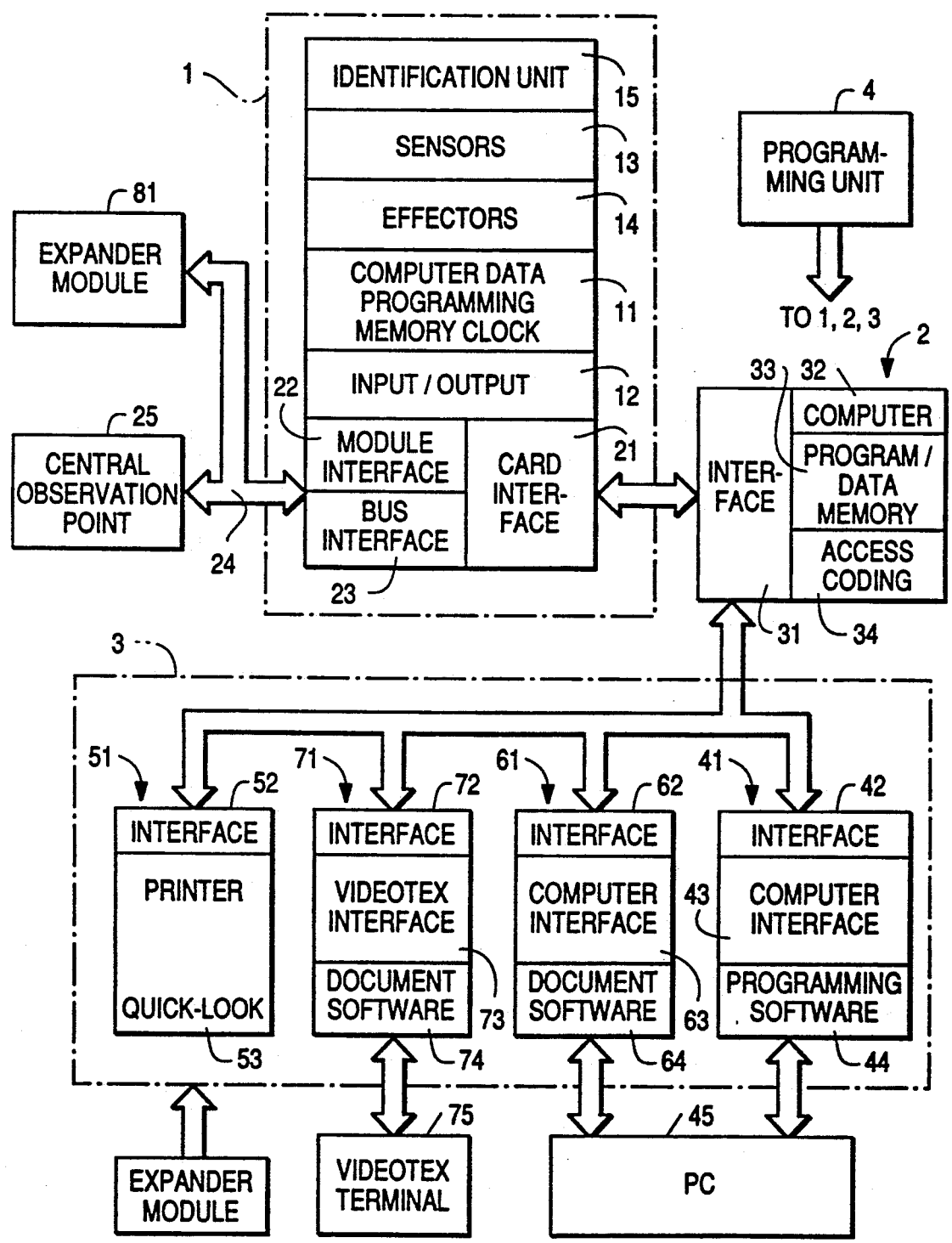
FIG. 1 is a function block diagram of a system for control and monitoring of the distribution of goods according to the invention.
Figure 2:
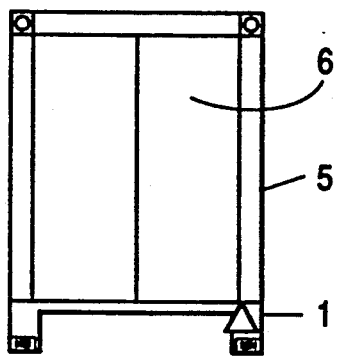
FIG. 2 is a schematic view of a transport container with a control and monitoring unit of a system according to the invention.

Referring to FIG. 1, a system for the control and monitoring of the distribution of goods comprises a first unit 1, specifically a control and monitoring unit; a second unit 2, specifically an active programmable memory card; a third unit 3, specifically an analysis unit; and a fourth peripheral unit 4, specifically a programming unit which, in turn, is accessible by way of an original coding 4a. The control and monitoring unit 1 is mounted on a transport container 5 (FIGS. 2, 3 and 4), for example, in the area of its base, for a freight 6 to be transported. The control and monitoring unit has a computer 11 with data and program memories as well as a real-time clock, which is connected with an input-/output unit 12. In addition, sensors 13, actuators 14 and an identification unit 15 are provided.

The sensors 13 measure, for example, the mechanical stress to which the goods are subjected that are to be transported, such as acceleration or pressure; the climatic stress, such as temperature and humidity; the chemical stress, such as odor, vapors, etc.; and other factors which are important with respect to the freight to be transported.

The actuators 14 which cooperate with the sensors 13 indicate, for example, the functional capabilities of different components of the transport system, or trigger an acoustical or visual alarm when preset limits values are exceeded, for example, with respect to the time or the mechanical stress to the goods to be transported.

The computer 11 with the data and program memories as well as the real-time clock is accessible only to authorized persons (such as originators and addressees) by means of an access code for the purpose of starting, stopping or changing the sequence of the program, i.e., the distribution process. The individual coding with respect to the person and the transport path is actively programmed by way of the programming unit 4 and the original coding 4a, and can be deleted or altered only by an authorized person by means of an original coding. It is here also that the inputting of limit values for the respective transported goods takes place which are necessary for the monitoring.

The purpose of the computer with its system components is to log all parameters considered important, together with the date and the current time, during processing of the transported goods. Such parameters may include, for example, the points in time at which a limit value was exceeded; the duration of the exceeding of this limit value; the waiting period before a triggered alarm was acknowledged or eliminated; or data related to business management, such as points in time when the responsibility was transferred from one forwarding agent to the next.

Figure 3:
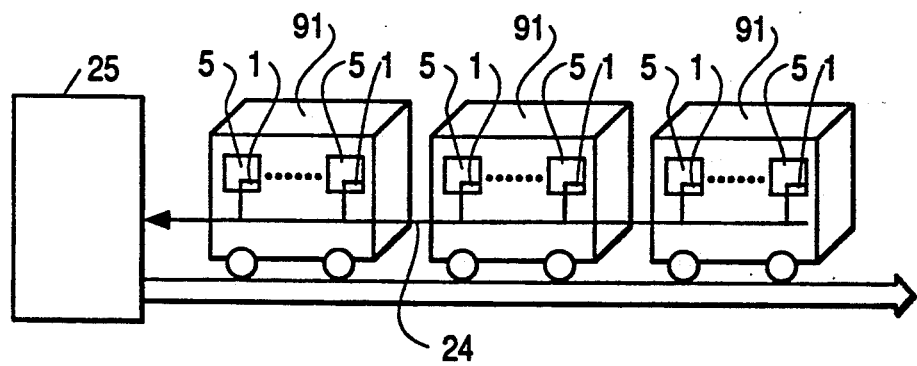
FIG. 3 is a representation of a family concept of the system according to the invention during the transport of a plurality of goods, in this case, by means of a freight train.
Figure 4:
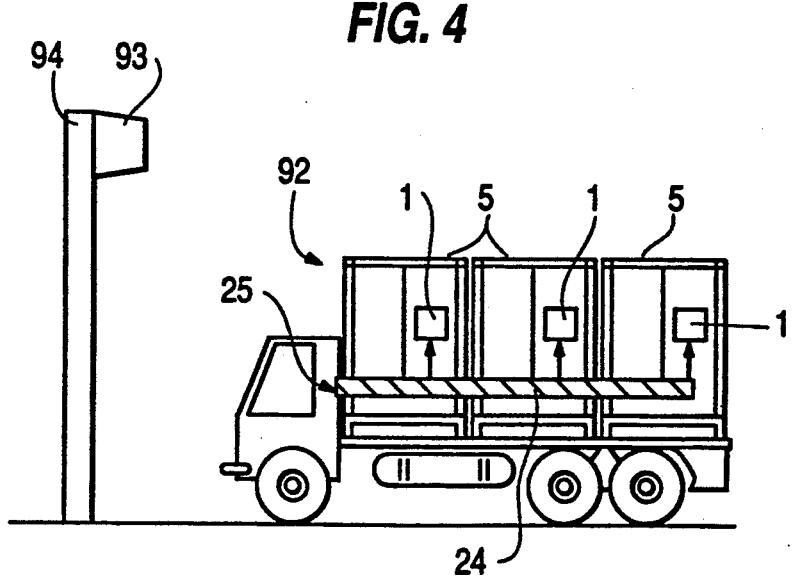
FIG. 4 is a schematic representation of a truck carrying several transport containers, also for demonstrating a family concept of the system according to the invention.

As depicted in FIG. 1, the input/output unit is constructed in three parts and has a card interface 21, a bus interface 22 as well as a module interface 23. (The latter two interfaces may be combined to a joint interface.) The communication of the control and monitoring unit to the outside takes place exclusively by way of standardized interfaces. For the programming, coding, monitoring and control of the control and monitoring unit I, all data can be read in or out by means of the memory card 2. The control and monitoring unit 1, and particularly the data processing elements (that is, the computer), if possible, are arranged at a hidden point on the goods or on the transport container in order to prevent, if possible, deliberate destruction or deception of data.

Where several transport containers 5 are transported on a vehicle or a train, as shown in FIGS. 3 and 4, several control and monitoring units 1 of this type may connected via interface 22 with a common databus 24, which may, for example, be an optical waveguide bus. Data from the respective control and monitoring units may thus be combined to a central unit 25, a socalled central control point in which the data of all control and monitoring units are collected and possibly summarized. By means of this central control point 25 transit controls of all transported goods at certain transit stations may be facilitated. By way of the joint data bus, information from the individual control and monitoring units, such as the type of the alarm and the location of the alarm in one of the transport containers is, reported to the central control point. Similarly, the abovementioned sensor signals with respect to mechanical or climatic stress to the transported goods may also be collected here and stored in a centralized manner.

The energy supply to the central control point preferably takes place by way of the databus proper. For this purpose, as well as energy supply to the control and monitoring units, batteries may be provided, with conventional battery buffers in order to prevent a destruction of data. Closed circuits are preferable in this case. Irrespective of whether several control and monitoring units 1 are switched together by way of a data bus 24, any control and monitoring unit 1 can be accessed by means of a memory card 2.

The identification unit 15 carries the identification code assigned to the transport container and the transported goods therein. Identification unit 15 comprises, for example, an identification sensor, such as a bar code and an intelligent electronic system connected behind it. The identification code, which is required in the technical loading and unloading concept of a fast freight traffic, is transmitted to the control and monitoring unit 1 in the online mode by means of the memory card 2. The identification code indicates the type of merchandise, the destination address, the name of the originator and of the addressee, etc. and, at the same time, is an input signal in the overall system with respect to the loading and unloading of the transport container. In principle, the automatic identification unit is an actuator with signal generators connected behind it, and thus furnishes a signal element, on the one hand, for the external logistics and, on the other hand, for the internal control and monitoring of the goods on the transport path. As indicated in FIG. 1, it is also conceivable that the data of the identification unit can be read in and out not only by way of the active memory card, but also by an external inquiry unit 16 which, in turn, is in a signal contact, for example, with the analysis unit 3. A transfer is also possible to a portable quick-look unit 51 of the analysis unit 3 which is described below.

The memory card 2 is the access unit to the control and monitoring unit I and is an active codable unit. It comprises all necessary systems of an interdisciplinary online system. In addition to an interface 31, as the input/output circuit, the memory card 2 has a computer 32, a program and data memory 33 as well as an access coding 34 which permits, among other things, a clear identification of the owner of the transported goods. By way of interface 31, the memory card 2 may be programmed from the outside via programming unit 4 and the original coding 4a, data may be inputted into and removed from the control and monitoring unit 1, and data may be exchanged with the analysis unit 3.

As its main component, the analysis unit 3 has a stationary analysis unit 41 with an interface 42 for the memory card 2, a computer interface 43 and a basic-program module for a basic software. This block may be connected, for example, with a computer 45, which may be a personal computer. By means of this arrangement, all data may be read out of the memory card 2 and processed. It is also possible to write programs into the memory card 2 by way of the computer 45. In addition to this stationary analysis unit 41, a portable unit 51 is provided which also has an interface 52 for the memory card 2 and has a, for example, graphics-quality printer 53 connected to it. This portable unit can be constructed in pocket-size as a so-called quick-look unit and indicates to the respective operating person up-to-date control data concerning the distribution process. This may take place, for example, according to the yes/no-principle.

In addition, another stationary read-only unit 61 may be provided, for example, at the operating site of personal computer 45, with conventional peripheral equipment, such as the videoscreen, the keyboard, the printer, the plotter, etc. This unit has a card interface 62, a computer interface 63, and a software module 64 for a basic software with respect to the documentation. In this unit, the stored data can be processed relative to their application by means of the present and inputtable programs.

Finally, a videotex unit 71 having a card interface 72, a videotex interface and a software module 75 may be provided with respect to the documentation, this unit being connected with a videotex terminal 75. By means of a correspondingly modified card interface, the stored data may be displayed on the videotex terminal 75 and be transmitted from there to other data stations.

As indicated in FIG. 1, the individual control and monitoring units 1 may be expanded by expander modules 81, for example, for the coupling-in of a tachograph. These expander modules 81 are connected by way of the module interface 22 or the combined interface 22, 23. The expander modules may, for example, be plug-type modules. The central control point 25 and the expander modules 81 permit a family concept for the overall control and monitoring system.

FIG. 3 illustrates three freight train cars 91, each having several transport containers 5 with which one control and monitoring unit 1 is connected respectively. All control and monitoring units are connected with one another by way of a bus 24 and lead to a central control point 25. Similarly, FIG. 4 shows a truck 22 which carries several transport containers 5. Each container carries a control and monitoring unit 1 which, in turn, is connected with the other control and monitoring units by data bus 24 which ends at a central control point 25. As part of this central control point or in addition to it, the mentioned expander modules 81 may be provided, such as the above-mentioned position and transmitting modules. In the central control point, the data from all control and monitoring units may be combined, if necessary. This makes it possible, for example, for a truck 92 which, as shown in FIG. 4, drives through a gate 93, to identify itself to a central control point in the gate 93, which is programmed with respect to the data to be received. Should the truck have loaded other goods than those previously indicated or not have loaded the preset number of goods, the central control point 93 can trigger an alarm. By means of the central control point, consequent reactions may be switched, and the positions of transport containers and their actions may be reported and detected. Likewise, if necessary, by means of the central control point 93, the data from the expander modules 81 may be compared with available preset data.

Figure 5:
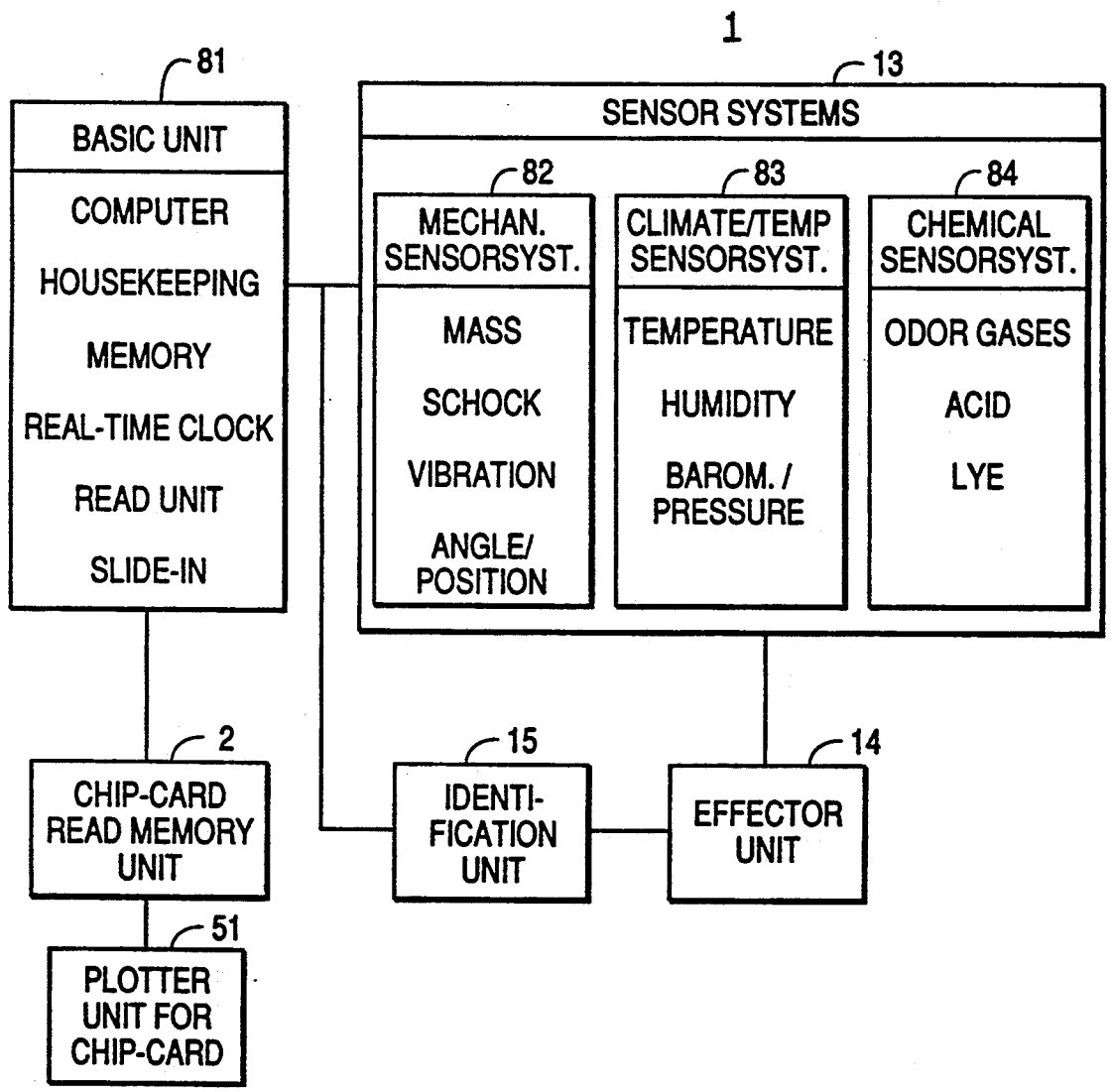
FIG. 5 is a function block diagram of a control and monitoring unit.

FIG. 5 schematically indicates the function units of the monitoring and control unit 1. The basic unit 81 essentially comprises the computer which takes over the managing, the socalled housekeeping; the data and program memories, a real-time clock, the read unit as well as the slide-in module for the active memory card, thus the elements 1, 12, 21, 22 and 23 of the unit 1 shown in FIG. 1. The sensors 13 have a mechanical sensor system 82; a sensor system 83 with respect to the climate and temperature; and a chemical sensor system 84. By means of these sensors, the mass of the transported goods, possible shocks on these goods or the position of the goods to be transported are measured; or the temperature, the humidity and the barometric pressure; or the smell, the formation of gases, of acids and lyes are measured. The sensor system 13, on the one hand, is connected with the basic unit 81; however, connections to the actuator unit 14 are also possible, in order to thus, immediately, for example, trigger an alarm. The identification unit 15, in turn, is connected with the basic unit and also with the actuator unit 14 so that possible data of the goods transported can be displayed, for example, directly by way of actuators. The active memory card 2 communicates with the basic unit and, in turn, may be pushed into the portable quick-lookunit 51 in order to rapidly print out data in this manner.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A system for controlling and monitoring the distribution of goods and merchandise, comprising a control and monitoring unit which is firmly connected with the goods or their transport container and which has a circuit with a programmable memory for storing information concerning the type of the goods and the destination address as well as other freight-specific data, an active programmable memory card communicating with the control and monitoring unit and having a memory circuit for the transmitting and receiving of data to and from the control and monitoring unit, as well as an analysis unit for the analyzing of the data transmitted and received;

said control and monitoring unit, comprising a computer as well as sensors and actuators detecting, storing and displaying the momentary condition of the distribution process and of the merchandise;

said active programmable memory card, being constructed with an integrated circuit with data and programming memories communicating by way of an interface with said control and monitoring unit for the inputting and receiving of data; and said analysis unit having an interface for communication with the memory card.

2. A system according to claim 1, wherein one or more of said control and monitoring unit and said the memory card have code circuits which permit the access thereto, only by means of a code to be inputted into the memory card.

3. A system according to claim 1, wherein the data memory of the memory card is adapted to be used only by the control and monitoring unit or after the input of an original coding.

4. A system according to claim 2, wherein the data memory of the memory card is adapted to be used only by the control and monitoring unit or after the input of an original coding.

5. A system according to claim 1, wherein the control and monitoring unit has an input/output circuit with a first interface for communication with the memory card, and a second interface for communication with a common data bus system whereby several of such control and monitoring units can be coupled together.

6. A system according to claim 2, wherein the control and monitoring unit has an input/output circuit with a first interface for communication with the memory card, and a second interface for communication with a common data bus system whereby several of such control and monitoring units can be coupled together.

7. A system according to claim 5, wherein said common data bus is an optical fiber bus.

8. A system according to claim 6, wherein said common data bus is an optical fiber bus.

9. A system according to claim 5, wherein several control and monitoring units are connected by way of the bus system, with a central unit adapted to store data from each of said control and monitoring units.

10. A system according to claim 7, wherein several control and monitoring units are connected by way of the bus system, with a central unit adapted to store data from each of said control and monitoring units.

11. A system according to claim 1, wherein said sensors of each control and monitoring unit are adapted to record and indicate mechanical, chemical and climatic influences on the goods to be transported.

12. A system according to claim 2, wherein said sensors of each control and monitoring unit are adapted to record and indicate mechanical, chemical and climatic influences on the goods to be transported.

13. A system according to claim 5, wherein said sensors of each control and monitoring unit are adapted to record and indicate mechanical, chemical and climatic influences on the goods to be transported.

14. A system according to claim 1, wherein the said control and monitoring unit is adapted to receive expander modules whereby additional control and monitoring functions can be carried out.

15. A system according to claim 5, wherein the said control and monitoring unit is adapted to receive expander modules whereby additional control and monitoring functions can be carried out.

16. A system according to claim 1, wherein said control and monitoring unit has an identification unit for storing data concerning the merchandise and the distribution process, which identification unit is adapted to communicate with an external inquiry unit.

17. A system according to claim 5, wherein said control and monitoring unit has an identification unit for storing data concerning the merchandise and the distribution process, which identification unit is adapted to communicate with an external inquiry unit.

18. A system according to claim 16, wherein said inquiry unit is coupled to said analysis unit by way of a signal path.

19. A system according to claim I, wherein at least the programmable memory elements of said monitoring and control unit have a small size and are mounted on the goods or on their transport container in a hidden manner.

20. A system according to claim 1, wherein at least the programmable memory elements of said monitoring and control unit have a small size and are mounted on the goods or on their transport container in a hidden manner.

* * * * *